MINIATURE ROTARY DIAL

Filed Dec. 30, 1968 4 Sheets-Sheet 1

INVENTOR.
EDUARD J. PULLES
BY
James T. Whitesel
AGENT

MINIATURE ROTARY DIAL

Filed Dec. 30, 1968 4 Sheets-Sheet 2

Aug. 25, 1970 E. J. PULLES 3,525,821

MINIATURE ROTARY DIAL

Filed Dec. 30, 1968 4 Sheets-Sheet 3

3,525,821
MINIATURE ROTARY DIAL

Eduard J. Pulles, Elmhurst, Ill., assignor to Automatic Electric Laboratories, Inc., Northlake, Ill., a corporation of Delaware
Filed Dec. 30, 1968, Ser. No. 787,839
Int. Cl. H04m 1/28
U.S. Cl. 179—90 11 Claims

ABSTRACT OF THE DISCLOSURE

A telephone type rotary dial sufficiently reduced in size so as to easily enable mounting of the dial in the handset of a compact telephone instrument. In order to reduce the outside diameter of the finger wheel the finger holes are spaced around the entire periphery of the finger wheel and the spacing between all adjacent holes is approximately equal. In line with this, the dial includes a movable finger stop and coacting with a pawl-and-ratchet mechanism, a movable pawl stop for respectively providing the necessary interval between pulse trains and for allowing rotation of the finger wheel through an angle greater than 360° when the larger digits are dialed while, at the same time, rotation of the main dial gear during wind-up is prevented.

BACKGROUND OF THE INVENTION

Field

This invention relates generally to mechanical pulse generating apparatus for use in connection with telephones, and more particularly to pulse generating apparatus of the rotary dial type, wherein the dial is of a sufficiently reduced size to enable mounting of the dial in the handset of today's current compact telephone instruments.

Prior art

In the past, telephone instruments have taken the general form of a handset for housing the transmitter and receiver, and a stand for housing the ringer, dial, line terminating euipment and switchboard apparatus. Since the size of the stand has not been subject to severe limitations, the size of the dial has also not been of much concern.

Recently, considerable interest has been shown in the provision of a compact telephone instrument wherein the dial is mounted in the handset. If the dial is to be so mounted it must be as small as possible since the handset size is limited as to what can be easily and comfortably held in the hand.

The advantage of incorporating the dial in the handset reside in the fact that since the handset is considerably more portable than the stand, the user of the telephone is not confined to the immediate vicinity of the stand and is instead able to operate the dial anywhere that the handset cord will allow and in any position of the dial.

Accordingly, it is an object of the present invention to provide a compact and improved rotary dial that is economical to manufacture, easy to install in a telephone handset and yet reliable and relatively noiseless in operation.

It is another object of the invention to provide an improved rotary dial of the type known in the art in which the diameter of the finger wheel is made smaller by reducing the spacing between the last and the first finger holes as compared with conventional dials and in which, in spite of this reduction, safe operation of the dial is insured by permitting the dial shaft to rotate by an angle of more than 360°.

It is a more specific object of the invention to secure the foregoing benefits while at the same time providing a dial of simple and straightforward construction; and, more particulary, while providing a dial of a design—known per se—in which only a single device in the form of a pawl-and-ratchet mechanism is used to prevent both the governor and the impulse cam itself from operating during the wind-up motion of the dial.

It is another object of the invention to provide a rotary dial of the type permitting rotation of the dial shaft by a more than 360° angle and having improved means for preventing the additional impulse spring actuation—which is customarily introduced to safeguard proper operation between consecutive impulse series—from resulting in the generation of an extra dial impulse.

It is a further object of the invention to make such improved means available for the control of the party identification springs if provided in the dial.

SUMMARY OF THE INVENTION

Briefly, in accordance with the present invention, the miniature rotary dial includes a finger wheel of reduced diameter having ten finger holes spaced around the entire periphery. The finger holes are so distributed that the spaces between all but two of the holes are equal, and the space between these two, which are the first and last holes, is only slightly greater than the space between the others.

In order to yet insure the necessary spacing between consecutive impulse series the dial has a movable finger stop, with the result that the dial shaft is enabled to execute a more than 360° rotation. As indicated above, the dial has a single device, a pawl-and-ratchet mechanism, for preventing both the governor and the impulse cam of the dial from operating during the wind-up movement of the dial. This pawl-and-ratchet mechanism coacts with a rotatable stop element to form a constraining means such that the main gear of the dial from which the driving of both the governor and the impulse cam is derived is driven in only one direction and that, at the same time, the rotation of the dial shaft—and hence the main gear which is loosely mounted thereon—is limited to a predetermined maximum angle which is greater than 360°.

Before entering into a detailed description of the present dial a brief outline of its general organization may be helpful.

The main moving parts of the dial mechanism are mounted between an upper main plate and a lower secondary plate and comprise: a combined main gear and ratchet wheel, a pawl plate having a pawl pivoted thereon and an auxiliary gear, both fixedly mounted on a main shaft, and a movable stop element, referred to herein as the movable pawl stop, pivotally mounted on that shaft; a combined pinion and worm gear rigidly attached to a second shaft, with the teeth of the pinion portion of this gear meshing with those of the main gear; and a shunting gear rigidly attached to a third shaft with the teeth of the shunting gear meshing with the teeth of the auxiliary gear. It will be noted that the pawl plate and auxiliary gear are mounted on keyed portions of the main shaft. The two plates provide bearings for the three shafts. Shunt, impulsing and calling party identification spring pileups and a governor are mounted on the underside of the main plate while a number plate, main spring, movable finger stop and finger wheel are accommodated on the top side of the main plate. The lower end of the second shaft extends through the secondary plate and has an impulse cam mounted thereon.

By way of a general operational description of the dial, at the beginning of the dialing of a digit, the finger wheel is first rotated clockwise by the operator's finger to rotate the main shaft for winding up the main spring, rotating the auxiliary gear and its engaged shunting gear, and moving the pawl around the ratchet wheel over a number of teeth which is greater by one than the numerical value of the dialed digit. This feature as well as the rotation of the shunting gear by the auxiliary gear serves to control the suppression of the extra dial impulse as indicated above and as described in more detail later.

As is well known in the art, in order for the telephone system switching equipment to distinguish between consecutively dialed digits and to correctly operate, it is necessary that a minimum interval be insured between successive trains of digital impulses. In the case of the present miniature dial this is accomplished by means of the movable finger stop, which is frictionally coupled with the dial shaft and by virtue of which, regardless of which digit is dialed, the finger wheel is allowed to rotate an additional angular distance corresponding to the width of a ratchet tooth. As a result, during the wind-up motion of the dial the pawl always passes over one more tooth than corresponds to the numerical value of the dialed digit.

When the finger wheel is released at the end of its manual clockwise rotation, the energy stored in the wound main spring causes it to unwind and thus rotate the main shaft counterclockwise. Since the pawl plate and auxiliary gear are keyed to the main shaft as mentioned above, they will also rotate therewith and as the associated pawl is engaged with a tooth of the ratchet, the main gear is caused to rotate. Rotation of the main gear causes rotation of the combined pinion and worm gear, thereby causing the impulsing cam to operate the impulse springs and the worm gear to operate the governor for controlling the speed of rotation of the various shafts.

As mentioned above, when the finger wheel is rotated in the clockwise direction the shunting gear is driven by the auxiliary gear in one direction from its normal position, i.e. counterclockwise, and when the finger wheel is released it is driven by the first pinion gear in the opposite direction and back to its normal position. A small cam shaped surface is provided as an integral part of the inner side of the shunting gear for engaging a shunting spring to maintain a set of shunting contacts closed when the gear is in its normal position.

During an actual operation, and in describing the functioning of the shunting contacts, it is first pointed out that as the main shaft is rotated by the finger wheel upon dialing of a digit, the pawl and auxiliary gear are rotated clockwise, while the shunting gear is rotated by the auxiliary gear counterclockwise and at a different angular rate due to the gearing ratio between the auxiliary gear and the shunting gear. Therefore, when the shunting gear has been rotated sufficiently to enable the cam surface to move away from the shunting spring and thus allow the shunting contacts to open, the pawl has passed over the first ratchet tooth. During the remainder of the operation of the dial, the cam surface on the shunting gear is rotated further away from the shunting spring and the pawl will rotate over a number of ratchet teeth which corresponds to the numerical value of the digit dialed not counting the first tooth, and will then engage the steep flank of the last tooth passed over.

When the finger wheel is released at the end of the clockwise rotation, impulsing takes place as previously described. However, as the shunting gear approaches its original starting point, the cam thereon closes the shunting contacts to suppress transmission of the last impulse as generated by the impulsing cam. The time required for the generation of this last, suppressed impulse provides the above-mentioned minimum interval between successive trains of impulses.

As previously mentioned, according to the invention the dial is so designed that the finger wheel may be rotated through an angle equal to or greater than 360° and this happens when either the digit 9 or 0 is dialed. It has been noted that the pawl plate, which also has the pawl pivotally mounted thereon, is fixedly mounted—by ring staking—on the main shaft and thus rotates with the main shaft. The pawl stop is pivotally mounted on the main shaft and it is limited to approximately 40° of rotation by means of limit stops provided on the secondary plate. In the normal or indexing position of the dial, the main spring which is pretensioned by means of a hub keyed to the main shaft holds the pawl in engagement with a finger on the pawl stop and holds the pawl stop against one of the secondary plate limit stops. When the digit 0 is dialed, the main shaft rotates the pawl plate away from the pawl stop until it has rotated nearly 360°, at which time a tab on the pawl plate engages the opposite side of the pawl stop finger and thus pivotally moves the pawl stop until the dialing person's finger touches the finger stop at the limit of its clockwise rotation. If an attempt is made to rotate the finger wheel further, the pawl stop engages the other limit stop on the secondary plate to prevent such movement.

DESCRIPTION OF THE DRAWINGS

The nature of the invention and its distinguishing features and advantages, which reside in the construction and arrangement and combination of parts thereof, will be more clearly understood from the following detailed description, taken in conjunction with the accompanying drawings, wherein.

DETAILED DESCRIPTION

Figure 3:
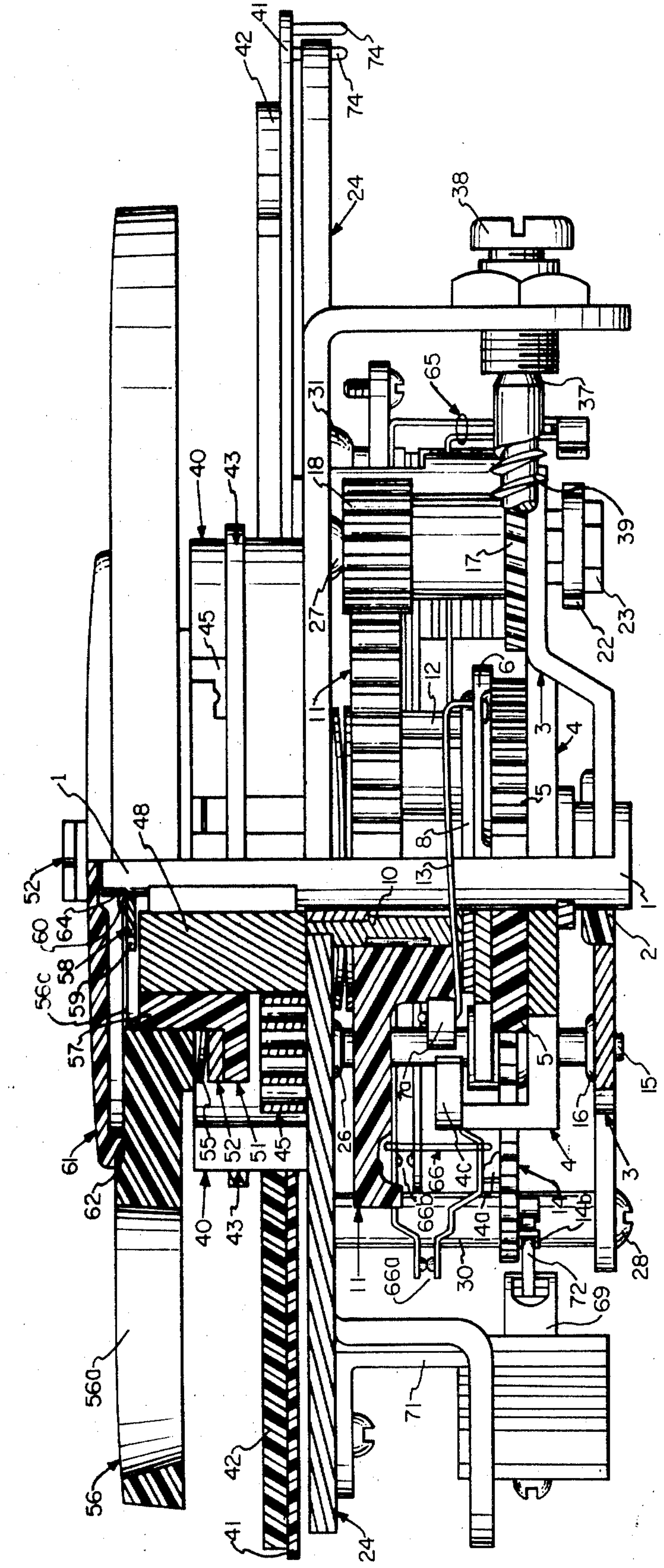
FIG. 3 is an enlarged side view of the dial, partly in cross-section, taken along the lines 3—3' of FIG. 1 and looking in the direction of the arrows.
Figure 4:
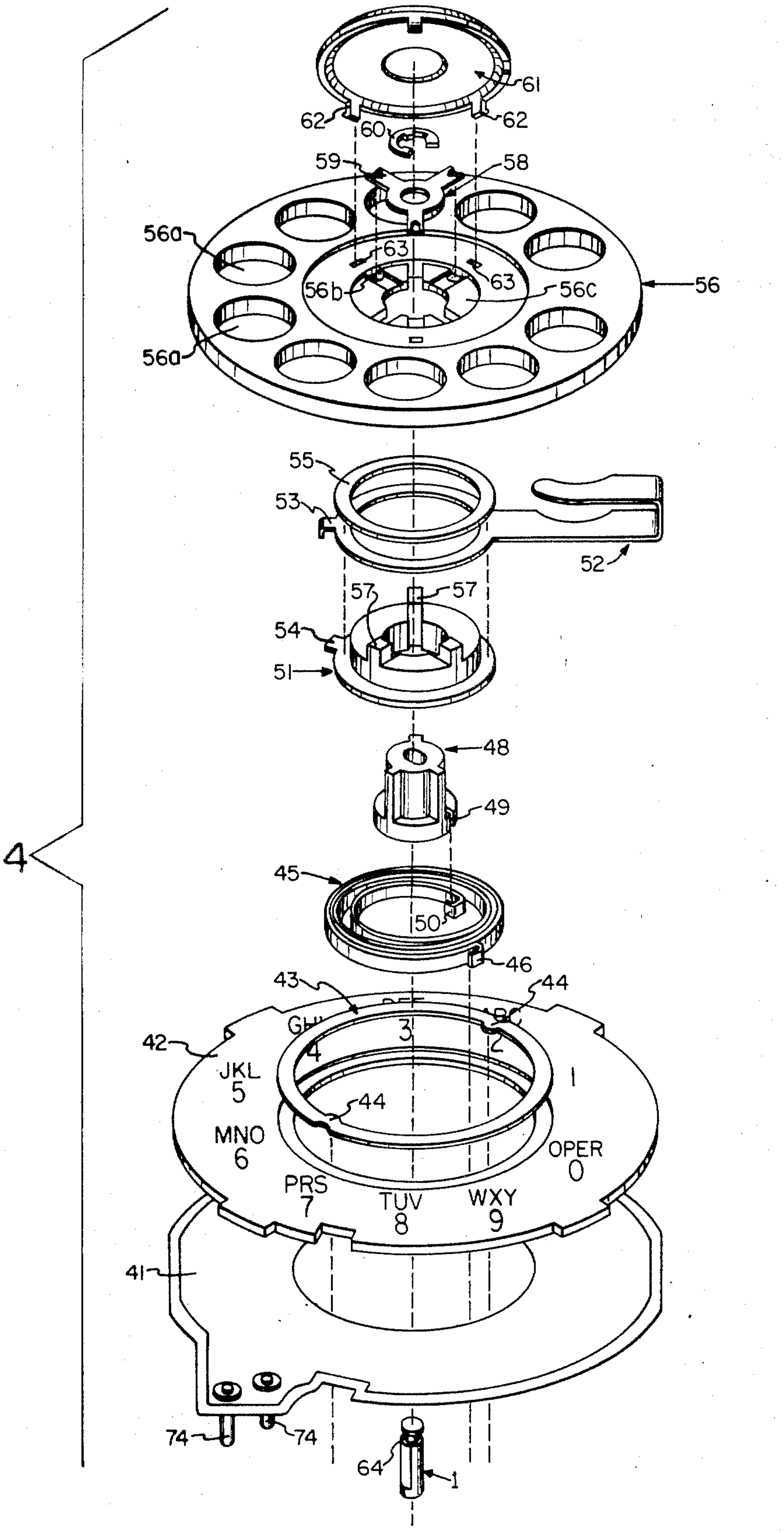
FIG. 4 and FIG. 4*a*, taken in combination show an enlarged exploded isometric view of the telephone dial with the movable finger stop and the pawl plate assembly shown in their extreme operated position in FIG. 4*a*.
Figures 4A, 4B:
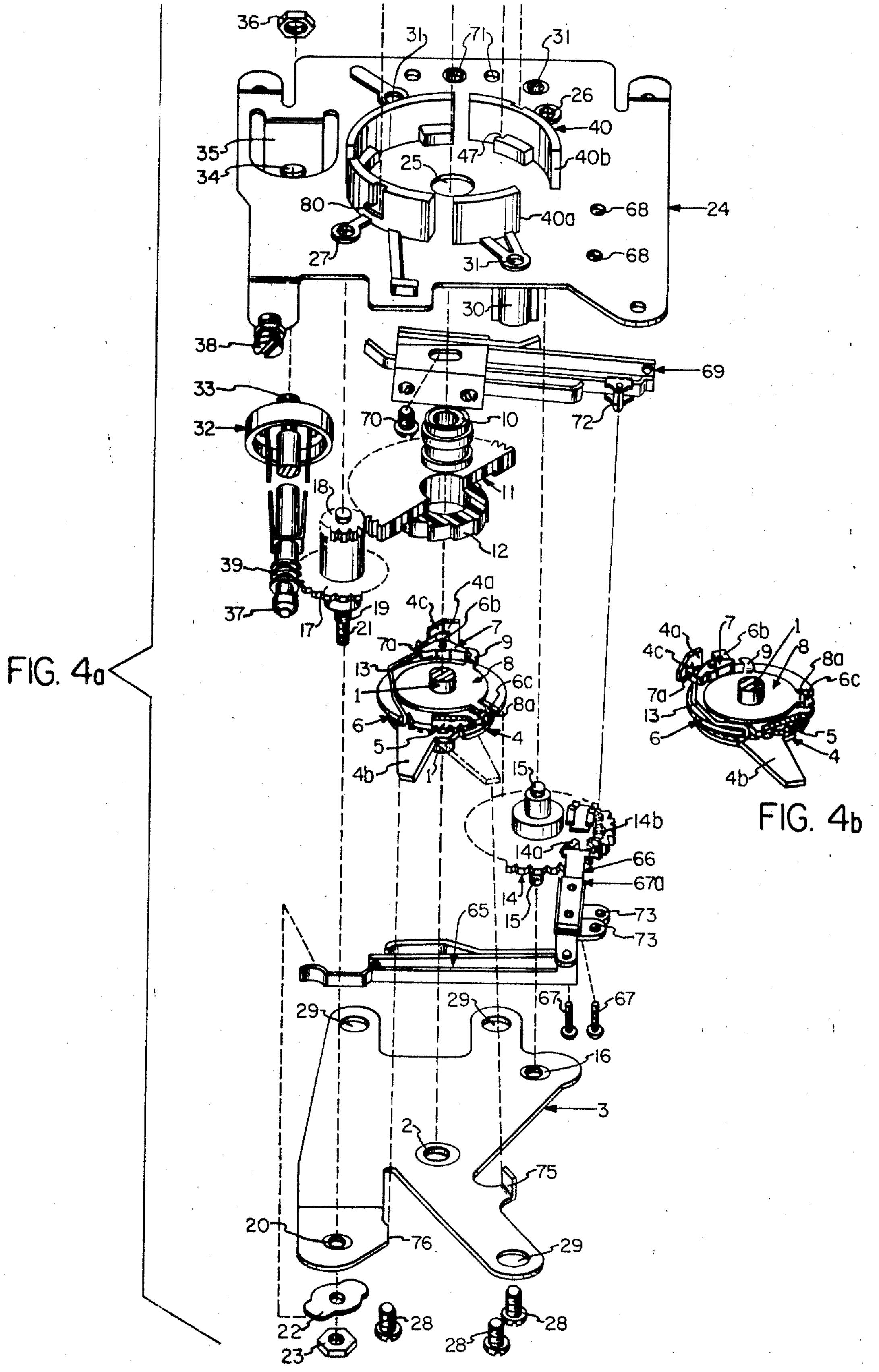
FIG. 4*b* shows the last-mentioned parts of the dial in the rest position.

Referring now to the drawings, and in particular to FIGS. 3, 4 and 4*a* it will be seen that the dial comprises a main shaft 1 that is journaled at its lower end in dielectric bearing 2 provided in secondary mounting plate 3. Pawl stop 4 is pivotally mounted on main shaft 1, while an auxiliary gear 5 is rigidly attached thereto. Disc, or pawl plate, 6 having pawl 7 pivotally mounted at its outer edge is also mounted on and rigidly attached to main shaft 1. Pawl silencer plate 8 is mounted over shaft 1 adjacent to disc 6, and pawl silencing hook 9 of plate 8 is disposed to the rear of, but not normally engaging pawl 7. Main bearing sleeve 10 is mounted within main gear 11 and this assembly is positioned over shaft 1, with the ratchet portion 12 of main gear 11 adjacent silencer plate 8, and pawl 7, which is of the pushing type, engaging one of the ten teeth of ratchet portion 12. Spring 13 is attached at one end to pawl 7 and at the other end to disc 6 to normally bias pawl 7 toward the teeth of ratchet portion 12. Shunting gear 14 is rigidly attached to shaft 15 and the lower end of shaft 15 is journaled in dielectric bearing 16 provided in secondary plate 3. Combined worm gear 17 and pinion gear 18 is rigidly attached to shaft 19, which at its lower end is journaled in dielectric bearing 20 in plate 3, with threaded portion 21 of shaft 19 extending through bearing 20, so that impulsing cam 22 may be attached thereto by means of nut 23. At this point in the description, it will be noted that the teeth of shunting gear 14 mesh with those of auxiliary gear 5 and that the teeth of pinion gear 18 mesh with those of main gear 11.

Main mounting plate 24 is positioned over the aforementioned part with the upper end of main shaft 1 extending through hole 25, and the upper flanged end of main bearing sleeve 10 tightly pressed therein. The upper end of shaft 15 is journaled in dielectric bearing 26, and the upper end of shaft 19 is journaled in dielectric bearing 27. Main mounting plate 24 is held in position by means of screws 28 extending through holes 29 in secondary plate 3, spacers 30 and into threaded holes 31 provided in main plate 24.

Governor assembly 32 is mounted on the bottom side of main plate 24 by inserting threaded end 33 through hole 34 of flange 35 and attaching nut 36 thereto. Bearing endpoint 37 of governor 32 is held in position by adjusting bearing screw 38 and its associated locking nut. With governor 32 mounted as described, it will be noted that the teeth of worm gear 17 mesh with worm 39.

Dielectric drum 40 comprises a plurality of sections, which are rigidly attached to the top of main plate 24. Electroluminescent lamp 41 and number plate 42 are positioned thereover and held in place on plate 24 by means of locking ring 43, which is placed around drum 40 and on top of number plate 42 and then rotated with fingers 44 engaging notches 80 of drum 40. Spiral main spring or power spring, 45 is mounted within drum 40, with its outer end 46 engaging catch 47 located on one section of the drum. Hub 48 is positioned within spring 45, with notch 49 engaged by the inner end 50 of the spring. Hub 48 is then rotated a predetermined number of turns in the clockwise direction to pretension spring 45 and is then pushed down over the top end of shaft 1, with the keyed portion of shaft 1 engaging corresponding portions in the center of hub 48.

Coupling element 51 is mounted over hub 48, with inner key portions of element 51 engaged by the outer key portions of hub 48. Movable finger stop 52 is placed over and resting on the outer flange of coupling element 51, with finger 53 located to the left of tab 54. Friction washer 55 is positioned over element 51 on top of finger stop 52 to frictionally couple the finger stop to element 51 and hence to dial shaft 1, and finger wheel 56 is mounted on element 51 with legs 57 engaging corresponding slots in the finger wheel. Holding washer 58 is positioned on finger wheel 56 with locking fingers 59 at first resting on top of legs 57.

Figure 1:
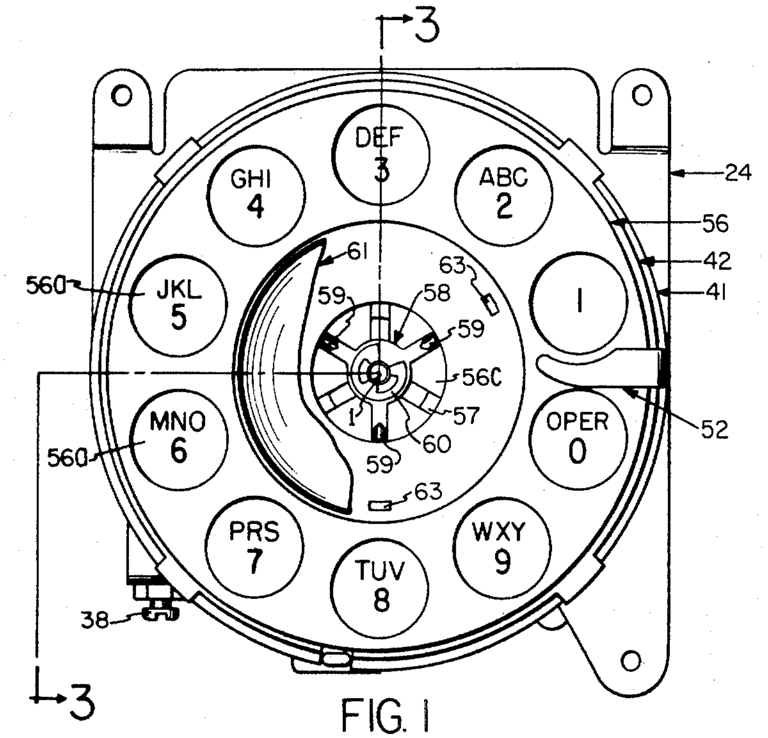
FIG. 1 is a top view of the telephone dial.

C washer 60 is pressed into keyed slot 64 of shaft 1 to lock the assembly in position and holding washer 58 is rotated about 60°, as shown in FIGS. 1 and 4, with fingers 59 bearing down on depressions **56*b* of ridges 56*c*, to permanently hold fingers wheel 56, friction washer 55, finger stop 52 and coupling element 51 on hub 48. Cap, or cover, 61 is mounted on top of finger wheel 56 with spring elements 62 engaging corresponding slots 63** of the finger wheel.

Impulsing contact spring assembly 65 and shunting contact spring assembly 66 are combined and mounted on the bottom of main plate 24 by means of screws 67 extending through holes in the entire combination and into threaded holes 68. The entire combination is so positioned that the free ends of the two assemblies extend in different directions from the common pile-up **67*a*, with the impulsing spring of assembly 65 adjacent impulsing cam 22 and the shunting spring of assembly 66 engaged by cam portion 14*a* of shunting gear 14**.

Figure 2:
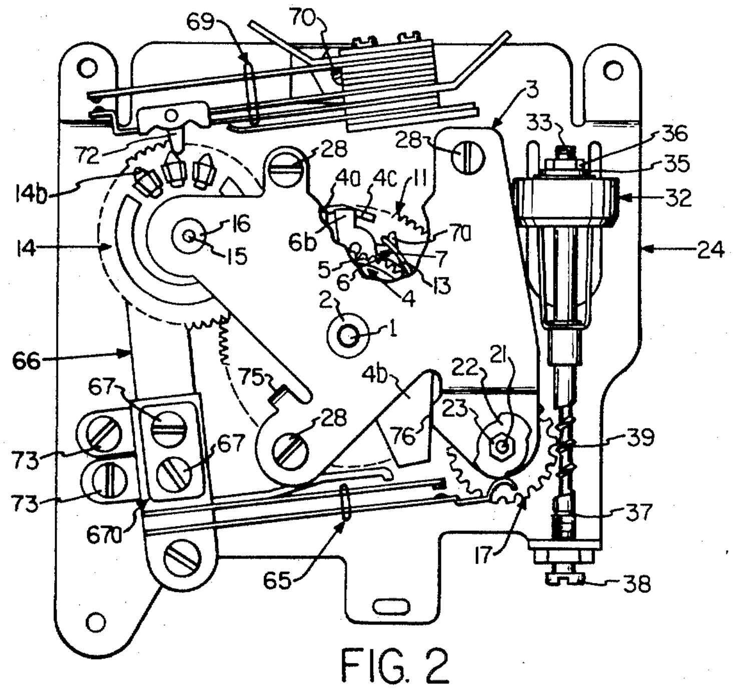
FIG. 2 is a bottom view of the telephone dial.

The calling-party-identification contact spring assembly 69 is mounted on the bottom of main plate 24 by means of screw 70 extending through a hole in the assembly and into a bracket 71 depending from the mounting plate as shown in FIG. 2. Assembly 69 is so positioned that actuating finger 72 is operable by cam elements or pins **14*b* (FIG. 2) of shunting gear 14**.

Electro-luminescent lamp 41 is provided with terminals 74, to which a source of potential may be connected for illuminating the numbers of number plate 42. Terminals such as 73 are provided for connecting the combined contact spring assemblies 65 and 66 with the telephone instrument wiring.

Power spring 45 was pretensioned, as mentioned above, for the purpose of causing the entire dial apparatus to seek a home, or rest, position. More specifically, after hub 48 was rotated a predetermined number of turns in the clockwise direction and then attached to the upper keyed end of shaft 1, the resultant action of spring 45 tends to rotate finger wheel 56, finger stop 52, hub 48, shaft 1, disc 6 and auxiliary gear 5 in a counterclockwise direction. As a result, and as shown in FIG. 4*b*, an outwardly extending ear **7*a* at the forward end of pawl 7 engages an inwardly slanting lip or finger 4*c* on upstanding portion 4*a* of pawl stop 4 to pivot it in a counterclockwise direction until the right-hand edge of arm 4*b* of pawl stop 4 (the rest position of which is also indicated in broken lines in FIG. 4), engages limit stop 75 on secondary plate 3. At this point disc 6 continues a small, but sufficient amount of its counterclockwise rotation whereby finger 4*a* pivots pawl 7, also counterclockwise, into a wedging engagement with the teeth of ratchet portion 12. Thus, due to the combination of the abovementioned engagement of limit stop 75 by the edge of pawl stop 4, and the wedging engagement of pawl 7 with the teeth of ratchet portion 12**, all counterclockwise rotation is stopped and a rest position for all the rotatable apparatus of the dial is established.

Before proceeding with an operational description of the dial, it is thought best to point out that FIG. 1 of the drawings shows the dial with finger wheel 56 and finger stop 52 in their normal rest position, and that FIG. 2 shows the dial apparatus in an operated condition, wherein the apparatus is approaching the rest position, with the contacts of the impulsing springs 65 being opened for the final pulse and shunting gear 14 about to return the calling-party-identifyfing pins **14*b* to normal. By this time shunting gear 14 has rotated cam portion 14*a* into engagement with the contacts of the shunting contact springs 66, thereby closing make or shunt contact 66*a* to shunt the last impulse generated by cam 22, as shown in FIG. 3. In FIG. 3 it has been assumed that the final rest position has been reached and that break contact 66*b*** accordingly has been opened, as will be further explained in connection with FIG. 5.

As shown in FIGS. 4 and 4*a*, it is noted that when the movable finger stop is mounted in its proper location, its rest position is such that the upper edge of the main arm of the finger stop is adjacent to end **40*b* of drum 40, and that its rotation is limited by spaced abutment ends 40*b* and 40*a* of drum 40, that is, by means independent of limit stops 75, 76 of pawl stop 4. It will also be noted that finger 53 and tab 54 coact with each other and with abutments 40*b* and 40*a*** to substantially confine movement of the finger stop in both the normal position and the final operated positions of the dial shaft.

Proceeding now with the description of the operation of the dial, it will first be assumed that the digit "3" is dialed by inserting the finger into the finger hole **56*a* directly above the numeral 3 and rotating the finger wheel 56 and finger stop 52 in a clockwise directional arc of movement until further rotation of the finger stop is halted by end 40*a* of drum 40. Since the operator's finger is engaging finger stop 52, further clockwise rotation of finger wheel 56** is prevented.

The clockwise rotation of finger wheel 56 is transferred to hub 48, which in turn winds power spring 45 and rotates main shaft 1 in a clockwise direction. Since auxiliary gear 5 and disc, or pawl plate 6 are rigidly attached to shaft 1 they will also rotate clockwise, whereby pawl 7 is stepped clockwise over a number of teeth on ratchet portion 12 which would correspond in number to the numerical value of the digit dialed, were it not for the above-described movement of finger stop 52 in the same direction; because of this movement pawl 7 is rotated a sufficient amount to allow it to always pass over one more tooth on ratchet 12 than corresponds to the dialed numerical value. In the present case, pawl 7 comes to rest behind the fourth ratchet tooth from its starting position on ratchet portion 12. Similarly, if the digit "0" were dialed, pawl 7 would step over a total of ten ratchet teeth, and then one extra to compensate for the movement of finger stop 52 for a total of eleven. However, even though the dial is arranged to generate a total number of impulses in accordance with the number of ratchet teeth passed over, the last impulse is always shunted to provide a pause at the end of each impulse train as will be later described.

Since shunting gear 14 meshes with auxiliary gear 5, gear 14 is rotated in a counterclockwise direction due to the clockwise rotation of gear 5. Cam portion **14*a* moves out of engagement with shunting springs 66 and opens the normally closed shunting contacts early enough in the rotation of gear 5 to prepare effective operation of the impulsing springs 65 before pawl 7 has passed over the first tooth of ratchet portion 12. Furthermore, the reduction gear ratio between gears 5 and 14 is such that even when shaft 1 and gear 5 thereon are rotated through their maximum angle of more than 360°, such as when a "0" is dialed, as described below, shunt gear 14** always executes a rotation of less than 360° so that the operation of the springs controlled by this gear is not interfered with.

When finger wheel 56 is released at the end of its clockwise movement, by the user removing his finger from the finger hole **56*a*, the energy stored in power spring 45 causes the finger wheel 56, finger stop 52, hub 48, shaft 1, disc 6 and auxiliary gear 5 to return to the previously-described rest position in a counterclockwise rotation. Since pawl 7, as assumed above, is engaged with the fourth ratchet tooth, ratchet portion 12 and main gear 11 will be driven in a counterclockwise direction until the rest position is reached. As main gear 11 meshes with pinion gear portion 18, portion 18 is driven in a clockwise direction to likewise rotate worm gear portion 17 and cam 22, whereby governor 32 is operated to regulate the return speed of the dial apparatus and cam 22 opens the contacts of the impulse springs 65 a total of four times. However, since shunting gear 14 is driven by auxiliary gear 5, the counterclockwise rotation of gear 5 drives gear 14 in a clockwise direction until three impulses (corresponding to the dialed digit) have been generated, at which time cam portion 14*a* closes the contacts of shunting springs 66** to electrically suppress the last, or fourth impulse.

If different digits are dialed, the same above-described operations will take place, with the number of teeth on ratchet portion 12 engaged by pawl 7 being always one greater than the numerical value of the dialed digit, while the number of impulses actually transmitted to the switching equipment is always equal to the numerical value of the dialed digit.

It will be noted that finger 72 of the calling-party-identification spring assembly 69 is arranged to be operated by any coded combination of pins **14*b* on shunting gear 14** to transmit a series of coded impulses (effective only during return motion of the dial, when dialing the first digit) to the central office for initiating calling-party-identification. For details of the operation of the party identification spring reference is made, for example, to U.S. Pat. Nos. 2,366,647 and 2,822,424 to John E. Ostline.

A description of the limit stop or constraining means, when the finger wheel 56 is rotated to its extreme position in the clockwise direction, will now be given. It will therefore be assumed that the digit "0" is dialed, with the clockwise rotation and operation of all the apparatus taking place in the same manner as described above during the dialing of the digit "3." It will be assumed that after the finger stop has become engaged by the user's finger, or dialing tool, a further rotation in the clockwise direction is imparted to the finger wheel by manipulation of the dialing tool or otherwise. Due to the dialing of the digit "0," finger wheel 56, shaft 1 and the apparatus fixedly coupled thereto (as opposed particularly, to ratchet 12 and main gear 11), will have rotated through an angle totaling 396°, and tab **6*b* on the far end of disc 6**, as viewed in FIG. 4*a*, also will have rotated the same amount and will now engage the left-hand side of the upstanding portion **4*a* of pawl stop 4. Forced clockwise rotation of finger wheel 56 further pivots pawl stop 4 until its opposite arm 4*b*** at its left-hand edge (FIG. 4*a*) engages stop 76 to inhibit further clockwise movement of the shaft. Damage to the dial is thus prevented.

Pawl silencer plate 8 is provided for reducing loud clicks when the pawl 7 is rotated over the teeth of ratchet portion 12: during clockwise rotation of disc 6 silencer plate 8 which is frictionally coupled to disc 6 for pivoting through a small angle, is caused to move its hook 9 into engagement with then end of pawl 7 and pivot it away from the ratchet teeth, as shown in FIG. 4*a*, thereby reducing the clicks. The amount of rotation of silencer plate 8 is limited by the engagement of a tab **8*a* on this plate with one or the other lateral edge of a slightly wider slot 6*c* in disc 6. At the beginning of the return movement of disc 6 hook 9** becomes similarly disengaged from the end of the pawl and remains in this condition throughout this return movement as shown in FIG. 4*b*, thereby permitting the pawl to drive ratchet 12.

Figure 5:
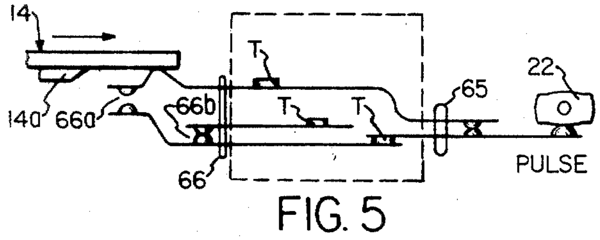
FIG. 5 is a simplified circuit diagram of the pulsing and shunting contacts of the telephone dial.

FIG. 5 is a circuit diagram showing the relation of the shunt springs to the impulse springs, and also the cams controlling these springs, in a schematic way. The same reference numerals have been used in FIG. 5 as in the other figures except that the spring terminals have been designated as T.

It will readily be seen from FIG. 5 that when the top spring of the set of shunt springs is engaged by shunt cam **14*a* shortly before completion of the return movement (indicated by the arrow) of shunt gear 14, make (or shunt) contact 66*a* closes before break contact 66*b* opens—these two contacts, of course, being actuated in the reverse order at the beginning of the wind-up movement. While make contact 66*a* serves to shunt the impulse springs 65 as shown and as previously explained, break contact 66*b*** may be used as an "off-normal" contact, that is, it may be connected to place a shunt across the voice transmission equipment (not shown) of the telephone while the dial is off-normal, thereby to improve impulsing and prevent dial clicks from being heard in the receiver. Thus, it will be seen that the shunt gear and its associated parts may serve three functions, namely suppression of the extra dial pulse, off-normal switching, and party-identification, and all this in spite of the fact that the dial shaft at times rotates by more than 360°.

It will be appreciated from the preceding description that a rotary dial has been created which combines the advantage of a notable reduction in size with that of having only a single device, a pawl-and-ratchet mechanism, for keeping the governor as well as the impulse cam from being driven during the wind-up motion of the dial; and that it accomplishes this in a simple manner while at the same time providing safe operation, in particular as to locking of the ratchet mechanism in its rest position and as regards insuring of a minimum spacing between impulse series.

What is claimed is:

1. In a telephone dial of the type wherein a gear from which the actuation of the impulsing cam of the dial is derived, is driven, only during the return movement of said shaft, by a pawl-and-ratchet mechanism under the action of the dial spring, said pawl being pivoted on a disc fixedly mounted on said shaft and said ratchet together with said gear being relatively rotatably mounted on said shaft for effective engagement by said pawl during said return movement only, said return movement being arrested by said pawl being wedged between said ratchet and a stop element, the improvement that said stop element is mounted for rotation relative to said shaft and for coaction with stationary stop means on said dial, the extent of rotation of said element being limited, during said return movement of the shaft by said stop element, under the action of said spring, being engaged by said pawl and in turn being urged against the second of said stops so as to define the normal position of said shaft, whereby rotation of said shaft by more than 360° is made possible.

2. A telephone dial having an impulse cam, mounting means, a dial shaft mounted for rotation on said means, a finger wheel mounted on, and fixedly with respect to, said shaft, a spring for returning said shaft to normal upon release of said finger wheel, two stops angularly spaced from each other and stationary with respect to said mounting means, a main gear mounted on said shaft and driving said impulse cam, a governor for regulating the speed at which said impulse cam is driven from said main gear and constraining means for keeping said gear to be driven from said shaft in the wind-up direction of said shaft while limiting the rotation of said shaft to a maximum angle greater than 360°; said constraining means comprising;

- a disc-and-pawl assembly including a disc mounted on, and fixedly with respect to, said shaft and a pawl pivoted on said disc;
- a ratchet mounted on said shaft for rotation, together with said gear, relatively to said shaft, said ratchet being effectively engaged by said pawl during the return movement only of said shaft; and
- a stop element mounted on said shaft for rotation relatively to said shaft;
  - the rotation of said element being limited, in the wind-up direction of rotation of said shaft, by said stop element being engaged by said assembly from one side and in turn being urged against one of said stationary stops so as to define the extreme operated position of said shaft, and being limited, in the return direction of rotation of said shaft, by said stop element being engaged by said assembly from the other side and in turn being urged against the other of said stationary stops to define the normal position of said shaft.

3. A telephone dial as claimed in claim 2 wherein said disc has an upstanding tab and wherein said rotatable stop element has at one end a stop arm the two sides of which cooperate with said two stationary stops, respectively, and has at the other end an upstanding portion and an inwardly slanted lip portion, one side of said extension being engaged by said tab at the upstanding portion of said extension in said extreme operated position of the shaft, and the other side of said extension being engaged by said pawl at the lip portion of said extension in said normal position of the shaft so that said pawl is wedged between said ratchet and said stop element, whereby the rotation of said ratchet is positively arrested in said normal position of the shaft.

4. A telephone dial as claimed in claim 2, including a movable finger stop frictionally coupled to said shaft for rotation relative thereto between two end positions, and abutting means independent of the aforementioned stationary stops for limiting the last-mentioned rotation to a certain angular distance, thereby to confine rotation of said finger wheel, when actuated to the operating limit of said finger stop by the finger of the user in a normal dialing operation, to an angle greater than 360° but smaller than said maximum angle of rotation of said shaft.

5. A telephone dial as claimed in claim 4 further including means fixedly coupled to said shaft and independent of said constraining means for substantially confining movement of said finger stop in both the normal position and the final operated position of the dial shaft.

6. A telephone dial as claimed in claim 2, wherein said mounting means include a main mounting plate and an auxiliary mounting plate, said dial shaft being mounted, and said main gear and said constraining means being disposed, between said plates, and said shaft having one end which extends through and beyond said main plate and on which said finger wheel is mounted.

7. A telephone dial as claimed in claim 6, wherein said spring is in the form of a spiral power spring mounted over one end of said shaft; wherein a hub is positioned within said spring and over said one end of said shaft; and wherein said main mounting plate, and said hub have means for attaching thereto the two ends of said spring respectively, said hub being keyable to said one end of said shaft upon a selected number of turns thereof whereby a desired amount of pretensioning may be imparted to said spring.

8. A telephone dial of the type permitting rotation of the dial shaft by a more than 360° angle, said dial comprising:

- a pair of impulse springs,
- means for actuating said springs on the return movement of said shaft at least one time more than corresponds to the numerical value of the digit dialed, and
- means for preventing the additional impulse spring actuation from resulting in an additional dial pulse, the last-mentioned means comprising contact means for shunting said springs and a reduction gear train through which actuation of said contact means is controlled, said gear train including a driving gear fixedly mounted on, and rotating with, said shaft and a control gear driven from said driving gear, said reduction being such that said control gear rotates over an angle of less than 360° for the maximum angle of rotation of said dial shaft, and said control gear having on one of its faces a cam element for actuating said contact means during the final portion of the return movement of said dial shaft, thereby to suppress said additional dial impulse.

9. A telephone dial as claimed in claim 8 wherein said contact means comprise a make contact connected in shunt with said impulse springs, and a break contact in electrical circuit connection with one of said impulse springs, said contact means being actuated by said cam element so that during the final portion of said return movement, said make contact closes before said break contact opens.

10. A telephone dial as claimed in claim 8 wherein said pair of impulse springs and said set of shunt springs are mounted as part of the same spring pileup but with their free ends extending in different directions.

11. A telephone dial as claimed in claim 8 wherein there is also provided a set of party identification springs, and wherein said control gear has, on its other face, cam elements cooperating with the last-mentioned springs.

References Cited

UNITED STATES PATENTS

| | | | |
|---|---|---|---|
| 3,108,159 | 10/1963 | Mattke | 179—90 |
| 3,105,122 | 9/1963 | Babb | 179—90 |

KATHLEEN H. CLAFFY, Primary Examiner

T. J. D'AMICO, Assistant Examiner